(12) United States Patent
Kuckelkorn et al.

(10) Patent No.: US 8,555,871 B2
(45) Date of Patent: Oct. 15, 2013

(54) RADIATION-SELECTIVE ABSORBER COATING AND ABSORBER TUBE WITH SAID RADIATION-SELECTIVE ABSORBER COATING

(75) Inventors: Thomas Kuckelkorn, Jena (DE); Kamel Silmy, Tourcoing (FR); Sebastian Dreyer, Tirschenreuth (DE)

(73) Assignee: Schott Solar AG, Mainz (DE)

( * ) Notice: Subject to any disclaimer, the term of this patent is extended or adjusted under 35 U.S.C. 154(b) by 393 days.

(21) Appl. No.: 12/903,625

(22) Filed: Oct. 13, 2010

(65) Prior Publication Data

US 2011/0088687 A1  Apr. 21, 2011

(30) Foreign Application Priority Data

Oct. 15, 2009 (DE) .......................... 10 2009 049 471

(51) Int. Cl.
*F24J 2/48* (2006.01)

(52) U.S. Cl.
USPC ............ 126/677; 126/676; 126/674; 126/634

(58) Field of Classification Search
USPC ........... 126/677, 651, 652; 428/336, 457, 639
See application file for complete search history.

(56) References Cited

U.S. PATENT DOCUMENTS

| | | | | |
|---|---|---|---|---|
| 4,202,006 A | * | 5/1980 | Khajezadeh | 257/550 |
| 4,446,199 A | * | 5/1984 | Gedwill et al. | 428/639 |
| 4,628,905 A | * | 12/1986 | Mills | 126/652 |
| 5,523,132 A | * | 6/1996 | Zhang et al. | 428/34.4 |
| 5,965,246 A | * | 10/1999 | Guiselin et al. | 428/212 |
| 6,045,896 A | * | 4/2000 | Boire et al. | 428/216 |
| 6,632,542 B1 | * | 10/2003 | Mahoney et al. | 428/632 |
| 7,013,887 B2 | * | 3/2006 | Kuckelkorn et al. | 126/652 |
| 7,037,577 B2 | * | 5/2006 | Macquart et al. | 428/216 |
| 7,037,588 B2 | * | 5/2006 | Decroupet | 428/428 |

(Continued)

FOREIGN PATENT DOCUMENTS

| | | |
|---|---|---|
| CN | 1512119 | 7/2004 |
| CN | 1670446 | 9/2005 |

(Continued)

OTHER PUBLICATIONS

Michael Lanzber et al: "Solar Selective Absortber Coating for High Service . . . " In SPIE vol. 1272 Optical Materials Technology for Energy Efficiency and Solar Energy Conversion IX, 1990, pp. 240-249 (In English).

(Continued)

*Primary Examiner* — Steven B McAllister
*Assistant Examiner* — J Crockett Hailey, III
(74) *Attorney, Agent, or Firm* — Michael J. Striker

(57) ABSTRACT

The radiation-selective absorber coating for absorber tubes of parabolic trough collectors includes two or more barrier layers (24a, 24b); an infrared reflective layer (21) on the barrier layers (24a, 24b); at least one cermet absorption layer (22) above the infrared reflective layer (21) and an antireflection layer (23) above the at least one cermet absorption layer (22). The two or more barrier layers (24a, 24b) include a first barrier layer (24a) of thermally produced oxide and a second barrier layer (24b) arranged above it. The second barrier layer (24b) is a cermet material including at least one oxide compound and at least one metal. The oxide compound is aluminium oxide, silicon oxide, nickel oxide and/or chromium oxide. The metal is molybdenum, nickel, tungsten and/or vanadium. The invention also includes an absorber tube with the absorber coating on it.

13 Claims, 2 Drawing Sheets

(56) References Cited

U.S. PATENT DOCUMENTS

| | | |
|---|---|---|
| 7,494,742 B2 * | 2/2009 | Tarnowski et al. ............ 429/162 |
| 7,637,259 B2 * | 12/2009 | Kuckelkorn et al. ......... 126/635 |
| 7,793,653 B2 * | 9/2010 | Kuckelkorn et al. ......... 126/651 |
| 7,909,029 B2 * | 3/2011 | Kuckelkorn et al. ......... 126/651 |
| 8,147,969 B2 * | 4/2012 | LaBrousse et al. ........... 428/426 |
| 8,318,329 B2 * | 11/2012 | Silmy et al. .................... 428/701 |
| 2002/0073988 A1 * | 6/2002 | Reichert et al. ............... 126/676 |
| 2004/0147185 A1 | 7/2004 | Decroupet |
| 2005/0189525 A1 * | 9/2005 | Kuckelkorn et al. ......... 252/582 |
| 2006/0141265 A1 | 6/2006 | Russo et al. |
| 2007/0235023 A1 * | 10/2007 | Kuckelkorn et al. ......... 126/652 |
| 2007/0281171 A1 | 12/2007 | Coster et al. |
| 2008/0121225 A1 * | 5/2008 | Kuckelkorn et al. ......... 126/635 |
| 2008/0308148 A1 * | 12/2008 | Leidholm et al. ............. 136/256 |
| 2008/0311389 A1 | 12/2008 | Roquiny et al. |
| 2009/0208761 A1 * | 8/2009 | Silmy et al. .................... 428/448 |
| 2009/0226743 A1 * | 9/2009 | Yasuda et al. ................. 428/448 |
| 2010/0294263 A1 * | 11/2010 | Kuckelkorn et al. ......... 126/676 |
| 2010/0313875 A1 * | 12/2010 | Kennedy ....................... 126/652 |
| 2013/0109131 A1 * | 5/2013 | Liang ............................. 438/95 |

FOREIGN PATENT DOCUMENTS

| | | |
|---|---|---|
| DE | 28 11 393 | 9/1979 |
| DE | 101 50 738 | 5/2003 |
| DE | 10 2004 010 689 | 6/2005 |
| DE | 10 2004 060 982 | 11/2006 |
| DE | 10 2005 057 277 | 6/2007 |
| DE | 20 2006 009 369 | 11/2007 |
| DE | 10 2006 056 536 | 2/2008 |
| DE | 10 2008 010 199 | 8/2009 |
| WO | 2005/010225 | 2/2005 |

OTHER PUBLICATIONS

C.E. Kennedy: "Review of Mid- to Hugh- Temperature Solar . . . " In NREL/TP-520-31267, Jul. 2002 (In English).

* cited by examiner

RADIATION-SELECTIVE ABSORBER COATING AND ABSORBER TUBE WITH SAID RADIATION-SELECTIVE ABSORBER COATING

CROSS-REFERENCE

The subject matter described and claimed herein below is also described in German Patent Application No. 10 2009 049 471.5, filed on Oct. 15, 2009 in Germany. This German Patent Application provides the basis for a claim of priority of invention for the invention described and claimed herein below under 35 U.S.C. 119 (a)-(d).

U.S. patent application, Ser. No. 12/780,007 filed on May 14, 2010, and U.S. patent application Ser. No. 12/372,070 filed on Feb. 17, 2009, also disclose and claim radiation-selective absorber coatings for solar power generating applications, which may be related to the radiation-selective absorber coatings disclosed and claimed in the following specification.

BACKGROUND OF THE INVENTION

1. The Field of the Invention

The invention relates to a radiation-selective absorber coating comprising at least two barrier layers, an infrared reflective layer applied on the barrier layers, at least one absorption layer arranged above the infrared reflective layer and an antireflection layer arranged above the at least one absorption layer, wherein a first barrier layer consists of a thermally produced oxide. The invention also relates to an absorber tube having a radiation-selective coating of this type, and to a method of operating a parabolic trough collector containing absorber tubes of this type.

2. The Description of the Related Art

Customary absorber coatings consist of a layer which is reflective in the infrared spectral range and is applied on a substrate, in particular a metal tube, a cermet layer having a high absorptance in the range of the solar spectrum and a covering layer applied on the cermet layer, which is referred to as an antireflection layer and, because of the high refractive index of the cermet layer, is provided for reducing surface reflection from the cermet layer.

A fundamental aim of research efforts is to achieve an energy conversion yield that is as high as possible. The energy conversion yield is dependent, inter alia, on the coefficient of the absorptance a and the emissivity E. A high absorptance greater than 95% and a low emissivity ($\epsilon$<10%) of the absorber coating is always the goal of research and development work.

Furthermore, the efficiency of the collector is determined by the temperature at which it is operated. From this standpoint, a temperature that is as high as possible is desired. However contrary to this the durability of the layer system of the absorber coating decreases with increasing operating temperature because of ageing and/or diffusion processes, as a result of which, for example, the absorptance of the cermet layer and the reflectivity of the reflective layer that reflects infrared radiation can significantly decline.

An absorber coating applied on a steel substrate comprises an antireflection layer composed of $SiO_2$, a cermet layer, an infrared reflective layer of molybdenum and a diffusion barrier layer consisting of $Al_2O_3$ arranged between the infrared reflective layer and the substrate. This absorber coating is described in the article entitled "Solar selective absorber coating for high service temperatures, produced by plasma sputtering" by Michael Lanxner and Zvi Elgat, in SPIE, Vol. 1272, Optical Materials Technology for Energy Efficiency and Solar Energy Conversion IX (1990), pages 240 to 249. Stresses exist which have an adhesion-reducing effect or lead to destruction and lumping of the layer system within this sort of layer system.

DE 10 2004 010 689 B3 discloses an absorber with a radiation-selective absorber coating. This coating has a metal substrate, a diffusion barrier layer, a metallic reflection layer, a cermet layer and an antireflection layer. The diffusion barrier layer is an oxide layer consisting of oxidized components of the metal substrate.

Molybdenum is usually used for the reflective layers that are reflective in the infrared range. However, the reflection properties of a molybdenum layer are not optimal, and so it is desirable to use better reflective materials.

The operating temperature of known absorber tubes is 300° C. to 400° C. in a vacuum. For the reasons described above, a fundamental goal is to further increase the operating temperature, but without impairing, for example, the absorption properties of the cermet layer and the reflection properties of the infrared reflective layer.

Such endeavors are summarized in C. E. Kennedy, "Review of Mid- to High-Temperature Solar Selective Absorber Materials", Technical Report of the National Renewable Energy Laboratory, July 2002 edition. This report discloses a layer structure composed of a $ZrO_xN_y$ or $ZrC_xN_y$ absorption layer and a layer of Ag or Al which is reflective in the IR range. This layer structure has improved thermal stability in air because of the introduction of an $Al_2O_3$ diffusion barrier layer. It was furthermore ascertained that the thermal stability of the infrared reflective layer under reduced pressure can be improved by introduction of a diffusion barrier layer below this layer. For this diffusion barrier layer, $Cr_2O_3$, $Al_2O_3$ or $SiO_2$ are proposed as the layer material. The hope is to achieve stability of the silver reflective layer up to 500° C.

However, still more durable layers in conjunction with improved absorptance and emissivity are desirable.

Therefore, DE 10 2006 056 536 A1 describes a radiation-selective absorber coating comprising at least two barrier layers, an infrared reflective layer which is reflective in the IR range and is arranged on the barrier layers, an absorption layer arranged above the infrared reflective layer, and an antireflection layer arranged above the absorption layer, which has a high solar absorptance and a low thermal emissivity. Although the adhesion of this absorber coating is sufficient, it still needed further improvement.

SUMMARY OF THE INVENTION

In this context, it is an object of the invention to provide an absorber coating whose individual layers have very good adhesion, such that the absorber coating is intrinsically stable.

It is a further object of the invention to provide an absorber tube having such an adherent coating and a method of operating parabolic trough collectors in which such absorber tubes are used.

These objects are achieved by means of the independent patent claims, namely by virtue of the fact that the second barrier layer, which is arranged above the first barrier layer, consists of cermet material composed of at least one compound selected from the group consisting of aluminium oxide, silicon oxide, nickel oxide and chromium oxide, and at least one element selected from the group consisting of molybdenum, nickel, tungsten and vanadium.

Preferably, the second barrier layer consists of cermet material composed of aluminium oxide and molybdenum.

The oxides in this cermet layer can also be present in a sub-stoichiometric proportion. In the case of aluminium and molybdenum, an $Al_xO_y$/Al/Mo cermet would then arise, in which x can have the values from 1 to 2 and y can have values from 2 to 3.

This cermet layer preferably has a thickness of 5 nm to 200 nm, particularly preferably a thickness of 10 nm to 50 nm. With thicknesses greater than 200 nm, the mechanical stresses in the layer system become so great that the layers above the adhesion-enhancing layer flake off or can be stripped away with very low force in a tape test. With thicknesses which are less than 5 nm, the barrier effect, that is the function of the layer as a diffusion blocking layer, is no longer provided.

The cermet layer composed of aluminium oxide and molybdenum preferably has a molybdenum filling factor of 20% to 70%, particularly preferably of 30% to 50%. With a filling factor higher than 70%, the metallic proportion in the layer is too high and the layer no longer blocks diffusion. With a filling factor lower than 20%, there are problems with the adhesion of the IR-reflective layer on the second barrier layer.

Preferably, the cermet layer as second barrier layer has a constant filling factor.

The screening of the infrared reflective layer with respect to the substrate by a two-layered barrier, in which the first barrier layer consists of a thermal oxide, e.g. contains chromium oxide and/or iron oxide, consists of e.g. chromium iron oxide, more effectively prevents diffusion, in particular thermally governed diffusion, of the substrate material, in particular of iron, from the steel absorber tube into the infrared reflective layer, and hence increases the long-term thermal stability of the coating.

Because the second barrier layer is formed from the above-described cermet material, in particular aluminium oxide and molybdenum, the adhesion of the barrier layer is significantly improved in comparison to those in the prior art. Because of the arrangement of at least one adhesion-enhancing layer, which is preferably present, between the first and second barrier layers, the adhesion of the overall layer can be significantly improved further.

This adhesion-enhancing layer between the barrier layers comprises molybdenum. Preferably, it consists of molybdenum. This adhesion-enhancing layer preferably has a thickness of 2 nm to 40 nm, particularly preferably of 5 nm to 20 nm.

The molybdenum has no optical function in this position in the layer stack. This adhesion-enhancing layer is inactive.

Preferably, the thickness of the first barrier layer of the at least two barrier layers is between 20 nm and 100 nm. With thicknesses of less than 20 nm, the barrier effect is not satisfactory, depending on the composition of the adjoining layer. With thicknesses of greater than 100 nm, thermal stresses occur which, under certain circumstances, could lead to layer detachment.

A third barrier layer can be arranged between the infrared reflective layer and the absorption layer, which preferably consists of cermet material. The cermet layer is preferably embodied as a gradient layer, which preferably consists of an $Al_xO_y$ compound, wherein x can have values of 1 or 2 and y can have the values 1, 2 or 3. It preferably has thicknesses of 10 nm to 50 nm.

The embedding of the infrared reflective layer between barrier layers and the associated formation of a sandwich has the advantage that it is also impossible for any material from the infrared reflective layer to diffuse into the overlying absorption layer and in this way to impair the absorption properties of the absorption layer. The substantial suppression of diffusion within the layer system, in particular into or from the infrared reflective layer, and into the absorption layer, can thus be ensured.

In this way, it is possible to achieve a high absorption where $\alpha > 95.5\%$ and a low emissivity where $\epsilon < 9\%$ at an operating temperature of 400° C. under reduced pressure. These properties remain unchanged even after accelerated ageing at 590° C. over a period of 3000 hours. The efficiency of a collector comprising an absorber tube provided with this coating can thereby be improved equally from two standpoints: the improved selectivity ratio $\alpha/\epsilon > 0.95/0.1$ means a higher yield for the incident radiation energy, and an increased operating temperature enables more efficient conversion into electrical energy. The long lifetime of this coating ensures the economic operation of a corresponding parabolic trough collector comprising absorber tubes coated in this way.

Specifically, the high temperature resistance of the absorber coating permits the use of inexpensive heat carrier media. The high thermal stability of the absorber coating permits operating temperatures for the absorber tubes of >450° C. up to 550° C.

It is advantageously possible to use a heat carrier medium having a boiling point of <110° C., in particular water. At the above-mentioned high operating temperatures, water vapor arises, which can be introduced directly into steam turbines. Previously used additional heat exchangers for transfer of the heat from oil to water are no longer required, and so, from this standpoint, parabolic trough collectors comprising absorber tubes with an absorber coating according to the invention can be viably operated very economically.

A further advantage is that the flow speed of the heat carrier liquid through the absorber tubes can be reduced, since a higher operating temperature is permissible, without disadvantages for the absorber tube coating. In this way, it is possible to save energy for operating the pumps of a parabolic trough collector.

The embedding of the infrared reflective layer between barrier layers has the further advantage that it is possible to use materials for that layer, such as silver, copper, platinum, or gold, which, although they diffuse more readily, have the crucial advantage over molybdenum that they reflect significantly better in the infrared range, such that an emissivity $\epsilon < 10\%$ can be achieved.

Preferably, the layer which is reflective in the IR range comprises gold, silver, platinum or copper or consists of gold, silver, platinum or copper.

The thickness of the infrared reflective layer is preferably 50 nm to 250 nm, depending on the material. Within this thickness range, a layer thickness of 100 nm to 150 nm is preferred if, in particular, copper or silver is used. Particularly when silver is used, preference may also be given to layer thicknesses in the range of 60 nm to 150 nm, preferably 80 nm to 150 nm. A layer thickness of 110 nm±10 nm is especially preferred. In other cases, layer thicknesses of 50 nm to 100 nm, in particular 50 to 80 nm, are also appropriate.

These small layer thicknesses for the infrared reflective layer are possible because the materials gold, silver, platinum and copper have a significantly higher reflectivity and, as a result of the packing between two barrier layers, cannot diffuse away into other layers or are not impaired in terms of their positive properties as a result of the diffusion of other interfering elements into them.

The higher cost of the noble metals Au, Ag and Pt can be compensated for, in some instances even overcompensated, by the significantly smaller layer thickness by comparison with the known layer thicknesses for the infrared reflective layer.

The thickness of the absorption layer is preferably 60 nm to 180 nm, particularly preferably 80 nm to 150 nm. The absorption layer is preferably a cermet layer composed of aluminium oxide with molybdenum or composed of zirconium oxide with molybdenum. Instead of a homogeneous absorption layer, it is also possible to provide a plurality of absorption layers having different compositions, in particular with a decreasing metal proportion, or a gradually variable absorption layer. This cermet layer is preferably a gradient layer, which is understood to mean a layer in which the metal proportion within the layer increases or decreases continuously, and also in steps in practice.

The layer thickness of the antireflection layer situated on the absorption layer is preferably 60 to 120 nm, preferably 70 nm to 110 nm. This layer preferably consists of silicon oxide or aluminium oxide.

An absorber tube, in particular for parabolic trough collectors, comprises a steel tube, on the outer side of which is arranged the above-described radiation-selective absorber coating, which comprises at least two barrier layers, at least one infrared reflective layer arranged on the at least two barrier layers, at least one absorption layer, in particular composed of cermet material, arranged above the reflective layer, and an antireflection layer applied on the absorption layer. The at least two barrier layers comprise a first barrier layer consisting of a thermally produced oxide and a second barrier layer. The second barrier layer advantageously consists of a cermet material composed of aluminium oxide and molybdenum.

The absorber tube preferably has a radiation-selective absorber coating as outlined in the embodiments preferred for the absorber coating.

Preferably, the cermet layer composed of aluminium oxide and molybdenum has a molybdenum filling factor of 20% to 70% and preferably of 30% to 50%.

Preferably, an adhesion-enhancing layer comprising molybdenum, preferably consisting of molybdenum, is arranged on the absorber tube between the first and second barrier layers.

With the absorber coating according to the invention and the absorber tube according to the invention, a method of operating a parabolic trough collector with absorber tubes through which a heat carrier medium is passed can be carried out, in which absorber tubes are used with a radiation-selective absorber coating having at least two barrier layers, at least one infrared reflective layer arranged above the at least two barrier layers, at least one absorption layer, in particular composed of cermet material, arranged above the infrared reflective layer, and an antireflection layer arranged above the absorption layer. The barrier layers include a first barrier layer, which faces the absorber tube and which consists of a thermally produced oxide, and a second barrier layer arranged above the first barrier layer. The second barrier layer consists of cermet material composed of aluminium oxide and molybdenum.

Heat carrier liquids having a boiling point of <110° C., in particular water, can be used as heat carrier liquid that is passed through the absorber tubes. However, it is also possible to use heat carrier liquids having a higher boiling point.

In accordance with a further embodiment, the method of operating the parabolic trough collector provides for the operating temperature of the absorber tubes to be set to 450° C. to 550° C., in particular to 480° C. to 520° C.

The method for operating a parabolic trough collector is preferably operated with absorber tubes having radiation-selective absorber coatings in the embodiments outlined as preferred for the absorber coating.

BRIEF DESCRIPTION OF THE DRAWING

The objects, features and advantages of the invention will now be illustrated in more detail with the aid of the following description of the preferred embodiments, with reference to the accompanying figures, in which.

DESCRIPTION OF THE PREFERRED EMBODIMENTS

Figure 1:
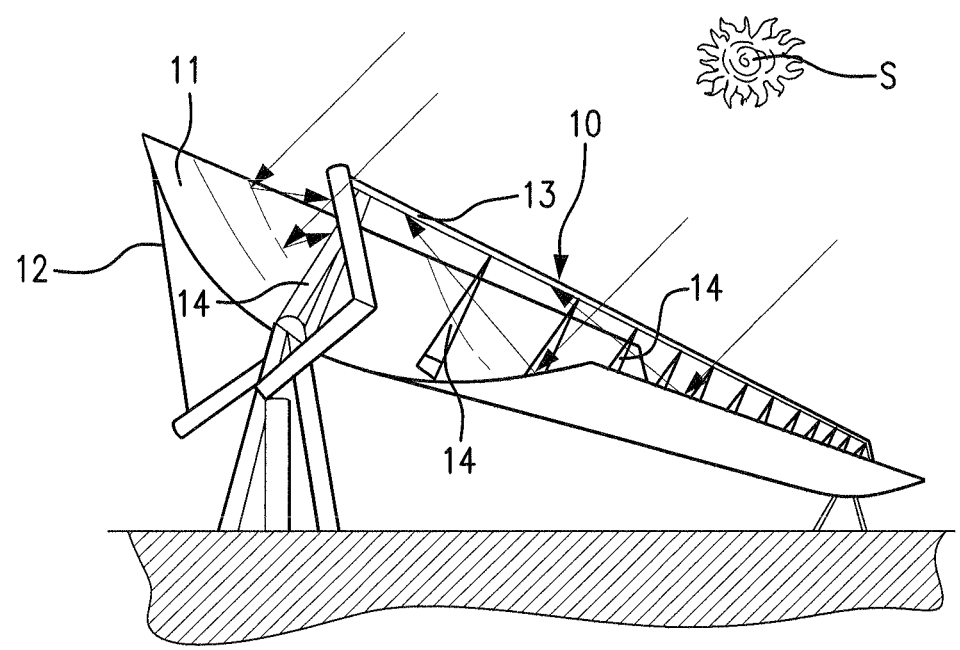
FIG. 1 is a schematic perspective view of a parabolic trough collector.

FIG. 1 illustrates a parabolic trough collector 10, which has an elongated parabolic reflector 11 with a parabolic profile. The parabolic reflector 11 is supported by a support structure 12. Along the focal line of the parabolic reflector 11 there extends an absorber tube 13, which is fixed to supports 14 connected to the parabolic trough collector. The parabolic reflector 11 forms a unit with the supports 14 and the absorber tube 13. This unit is pivoted about the axis of the absorber tube 13 and thereby uniaxially tracks the position of the sun S. The parallel solar radiation incident from the sun S is focused by the parabolic reflector 11 onto the absorber tube 13. A heat carrier medium, in particular water, flows through the absorber tube 13, the latter being heated by the solar radiation absorbed. At the outlet end of the absorber tube, the heat transfer medium can be withdrawn and fed to an energy consumer or converter.

Figure 2:
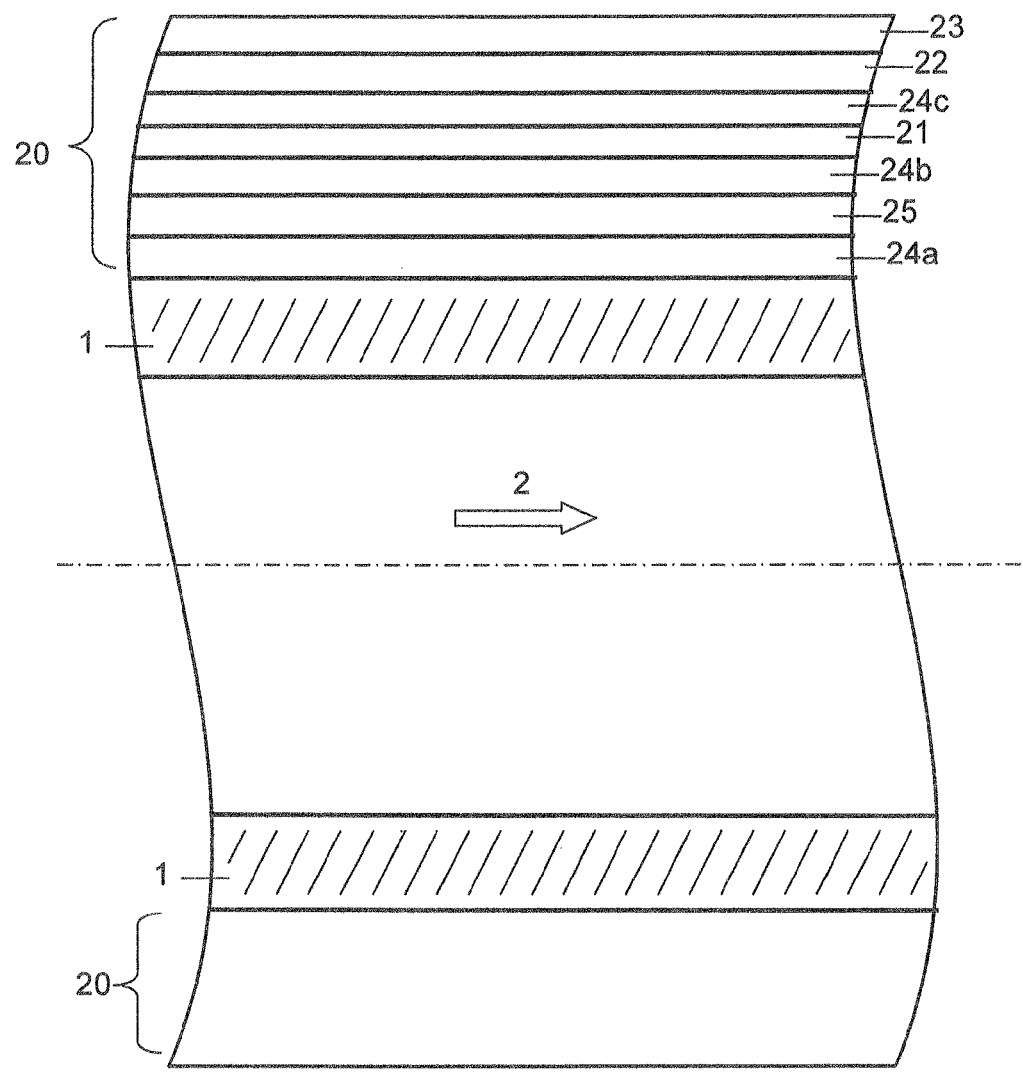
FIG. 2 is a schematic cross-sectional view through an absorber tube in accordance with one embodiment of the invention.

FIG. 2 schematically illustrates a section through an absorber tube 13. The absorber tube 13 comprises a steel tube 1, through which the heat carrier medium 2 flows and which forms the substrate for the absorber coating 20 on the outer side of the tube 1. The layer thicknesses of the individual layers of the absorber coating 20 are depicted as enlarged for simple illustration and with approximately equal thicknesses.

The absorber coating 20 comprises, in a direction from the inside of the tube 1 towards the exterior, a first barrier or diffusion barrier layer 24a composed of chromium iron oxide on the steel tube 1, which is produced by thermal oxidation of the steel tube 1; an adhesion-enhancing layer 25 composed of molybdenum applied on this first barrier layer 24a; a second barrier layer 24b composed of a cermet material comprising aluminium oxide and molybdenum; an infrared reflective layer 21, which is composed of gold, silver, platinum or copper; a third barrier layer 24c; a cermet layer 22 applied on the third barrier layer 24c; and an antireflection layer 23, which terminates the outer side of this layer system.

The absorber tube 20 in accordance with the embodiment of FIG. 2 is coated by the method described herein below.

The steel tube 1, preferably a stainless steel tube, is polished and then cleaned. A surface roughness $R_a$ of <0.2 μm is preferably achieved during polishing. The stainless steel tube is subsequently oxidized thermally at a temperature of >400° C. for approximately half an hour to 2 hours, in particular at 500° C. for approximately 1 hour. In the process, an oxide layer having a thickness of 15 nm to 50 nm, preferably 30 nm±10 nm, arises on the steel tube and acts as the first barrier layer 24a.

Subsequently, the steel tube is introduced into a vacuum coating installation and the installation is evacuated. After a pressure of less than $5 \times 10^{-4}$ mbar, preferably $1 \times 10^{-4}$ mbar, has been attained, the subsequent layers are applied by means of physical vapor deposition (PVD), in particular by means of cathode sputtering. For this purpose, the steel tube is led in rotating fashion past sputtering sources, i.e. past targets consisting of the coating substances, for example Al, Si, Ag and Mo.

In the first deposition step, the adhesion-enhancing layer composed of Mo is applied as the steel tube is led in a rotating fashion past the target. The layer thickness is 5 nm to 20 nm.

In the second deposition step, the second barrier layer 24b is applied in the form of a multilayer, by the tube being conducted in a rotating fashion between sources arranged opposite one another. A chamber pressure (argon) of between $10^{-2}$ mbar and $10^{-3}$ mbar, preferably $4\times10^{-3}$ mbar to $7\times10^{-3}$ mbar, is set in this case. Oxygen is fed to the aluminium target in order to produce aluminium oxide. The preferred layer thickness of this second barrier layer is 10 nm to 50 nm, and very particularly preferably 30 nm±10 nm. The molybdenum filling factor has a constant value of 20% to 70% through the entire layer.

In the subsequent third deposition step, the infrared reflective layer 21 is applied by depositing gold, silver, platinum or copper, preferably silver, with a thickness of 60 nm to 150 nm, particularly preferably of 110 nm ±10 nm, on the second barrier layer 24b.

In the fourth deposition step, the third barrier layer 24c is deposited in the form of a further $SiO_x$ layer or $Al_xO_y$ layer, by reactive sputtering of silicon or aluminium while supplying oxygen. The preferred layer thickness of this third barrier layer is at most 50 nm, particularly preferably 10 nm±5 nm. However, this third barrier layer is optional, since it has been found that, given a suitable composition of the absorption layer 22 applied on the reflection layer 21, diffusion does not need to be inhibited by an additional barrier.

In the fifth deposition step, the absorption layer, i.e. here cermet layer 22, is applied by simultaneous evaporation/sputtering of aluminium and molybdenum from one common crucible or from two separate targets. In this case, oxygen is introduced simultaneously into the sputtering region of the aluminium target in order to deposit aluminium oxide besides molybdenum.

In this case, in the fifth deposition step, the composition can be adjusted differently and varied during the course of the layer deposition by appropriate selection of the operating parameters (sputtering rates and amount of oxygen). Particularly when separate targets are used, the deposition of the molybdenum proportion can thus be varied relative to the deposition of the aluminium oxide proportion in the absorption layer 22. In other words, a molybdenum concentration gradient exists in the absorption layer 22, in which case the molybdenum concentration is preferably decreased during application of the absorption layer 22. The cermet layer is thus composed of a plurality of thin individual layers consisting of aluminium oxide and molybdenum layers in an alternating sequence with the thickness of the molybdenum layers decreasing in the direction toward the exterior. On the inner side of this layer, the molybdenum proportion is preferably 25% by volume to 70% by volume, particularly preferably 40±15% by volume, and decreases in the outward direction to 10% by volume to 30% by volume, particularly preferably 20±10% by volume.

Oxygen is preferably added in a sub-stoichiometric proportion in relation to the deposited aluminium proportion, such that a non-oxidized aluminium proportion remains in the absorption layer 22. This is then available as redox potential or oxygen getter, so that there is no formation of molybdenum oxide. The non-oxidized aluminium proportion in the absorption layer 22 is preferably less than 10% by volume, particularly preferably between 0 and 5% by volume, based on the overall composition of the absorption layer. The non-oxidized aluminium proportion can likewise be varied within the absorption layer by altering the operating parameters of evaporation rate and amount of oxygen.

Overall, the absorption layer 22 is preferably applied with a thickness of 60 nm to 180 nm, particularly preferably with a thickness of 80 nm to 150 nm, especially preferably with 120±30 nm.

In the sixth deposition step, the antireflection layer 23 is applied in the form of a $SiO_2$ layer, by depositing it by means of physical vapour deposition of silicon while supplying oxygen. The preferred thickness of the antireflection layer 23 thus deposited is 70 nm to 110 nm, particularly preferably 90±10 nm.

An absorber tube produced in this way was heated at 550° C. for 250 h in a vacuum heating apparatus. The pressure in the vacuum chamber was less than $1\times10^{-4}$ mbar during this heating period. After 250 h the heating was switched off. After the sample had been cooled to below 100° C., the vacuum chamber was ventilated and the sample was removed. The sample was subsequently analyzed spectrometrically, in the course of which it was possible to determine an integral solar absorptance of 95.5%±0.5% for an AM 1.5 direct solar spectrum and a wavelength range of 350-2500 nm. The thermal emissivity for a substrate temperature of 400° C. was determined to be 8%±2%.

Alongside samples coated according to the method described above, both samples having no second barrier layer below the metallic refection layer 21 and samples having a pure silicon oxide layer or a pure $Al_2O_3$ layer as a second barrier layer instead of a cermet layer according to the invention were coated. After coating, pull-off tests using adhesive film strips ("adhesive tape test") were carried out on the coatings. In the case of the samples without a second barrier layer and in the case of the samples having a pure silicon oxide layer as second barrier layer, detachment of the coating was ascertained at pull-off values of <10 N. In the case of samples having a pure $Al_2O_3$ layer, it was possible to detect adhesion up to approximately 20 N but within 24 h cracking was manifested on account of high inherent stresses in the coating. In the case of samples produced according to the method of the invention described above, it was possible to carry out pull-off tests up to 40 N without layer detachment. These experiments were repeated with the same result after ageing of the samples for 10 h at 590° C.

The absorption coating according to the invention therefore has not only the other required properties, such as high solar absorptance and low thermal emissivity, but also a good adhesion of the individual layers to one another.

In particular the adhesion of the barrier layers is significantly improved by comparison with the prior art.

PARTS LIST

1 Steel tube
2 Heat carrier liquid
10 Parabolic trough collector
11 Parabolic reflector
12 Support structure
13 Absorber tube
14 Support
20 Radiation-selective absorber coating
21 Infrared reflective layer, i.e. a layer that reflects infrared radiation
22 Absorption layer
23 Antireflection layer
24a First barrier layer
24b Second barrier layer 24c Third barrier layer
25 Adhesion-enhancing layer

We claim:

1. A radiation-selective absorber coating (20), in particular for absorber tubes (13) of parabolic trough collectors (10), said radiation-selective absorber coating (20) comprising
    at least two barrier layers (24a, 24b);
    an infrared reflective layer (21) that reflects infrared radiation, said infrared reflective layer (21) being arranged on said at least two barrier layers (24a, 24b);
    at least one absorption layer (22) arranged above the infrared reflective layer (21); and
    an antireflection layer (23) arranged above the at least one absorption layer (22);
    wherein the at least two barrier layers (24a, 24b)comprise a first barrier layer (24a) and a second barrier layer (24b) arranged above the first barrier layer, said first barrier layer consisting of a thermally produced oxide;
    wherein said second barrier layer (24b) consists of a cermet material composed of aluminum oxide and molybdenum; and
    wherein said second barrier layer (24b) comprises 20 to 70% by volume of said molybdenum.

2. The absorber coating (20) according to claim 1, further comprising at least one adhesion-enhancing layer (25) arranged between the first barrier layer (24a) and the second barrier layer (24b).

3. The absorber coating (20) according to claim 2, wherein said at least one adhesion-enhancing layer (25) is composed of molybdenum.

4. The absorber coating (20) according to claim 1, wherein the second barrier layer (24b) has a thickness of 5 nm to 200 nm.

5. The absorber coating (20) according to claim 1, wherein the absorption layer (22) consists of said cermet material.

6. The absorber coating (20) according to claim 1, wherein the infrared reflective layer (21) comprises gold, silver, platinum or copper.

7. The absorber coating (20) according to claim 1, wherein the infrared reflective layer (21) consists of gold, silver, platinum or copper.

8. The absorber coating (20) according to claim 1, wherein the infrared reflective layer has a thickness of 50 nm to 150 nm.

9. The absorber coating (20) according to claim 1, wherein the first barrier layer (24a) is a chromium iron oxide layer.

10. The absorber coating (20) according to claim 1, wherein the absorption layer (22) has a thickness of 60 nm to 140 nm.

11. An absorber tube (13), in particular for parabolic trough collectors, said absorber tube (13) comprising a steel tube (1), on an outer side of which is applied a radiation-selective absorber coating (20), and wherein said radiation-selective absorber coating (20) comprises
    at least two barrier layers (24a, 24b);
    an infrared reflective layer (21) that reflects infrared radiation, said infrared reflective layer (21) being applied on said at least two barrier layers (24a, 24bb);
    at least one absorption layer (22) arranged above the infrared reflective layer (21); and
    an antireflection layer (23) arranged above the at least one absorption layer (22);
    wherein the at least two barrier layers (24a, 24b) comprise a first barrier layer (24a) and a second barrier layer (24b) arranged above the first barrier layer, said first barrier layer consisting of a thermally produced oxide;
    wherein said second barrier layer (24b) consists of a cermet material composed of aluminum oxide and molybdenum; and
    wherein said second barrier layer (24b) comprises 20 to 70% by volume of said molybdenum.

12. The absorber tube (13) according to claim 11, wherein said radiation-selective absorber coating (20) comprises at least one adhesion-enhancing layer (25) arranged between the first barrier layer (24a) and the second barrier layer (24b).

13. The absorber tube (13) according to claim 12, wherein said at least one adhesion-enhancing layer (25) is composed of molybdenum.

* * * * *